Feb. 2, 1965  P. D. WALLING  3,168,002
PIPE CUTTING AND BEVELLING MACHINE
Filed March 1, 1963  4 Sheets-Sheet 1

INVENTOR.
PAUL D. WALLING,
BY
McMorrow, Berman & Davidson
ATTORNEYS.

Feb. 2, 1965 P. D. WALLING 3,168,002
PIPE CUTTING AND BEVELLING MACHINE
Filed March 1, 1963 4 Sheets-Sheet 3

INVENTOR.
PAUL D. WALLING,
BY
McMorrow, Berman & Davidson
ATTORNEYS.

Feb. 2, 1965  P. D. WALLING  3,168,002
PIPE CUTTING AND BEVELLING MACHINE
Filed March 1, 1963  4 Sheets-Sheet 4

FIG. 4.

INVENTOR.
PAUL D. WALLING,
BY
McMorrow, Berman & Davidson
ATTORNEYS.

United States Patent Office 3,168,002
Patented Feb. 2, 1965

3,168,002
PIPE CUTTING AND BEVELLING MACHINE
Paul D. Walling, Rte. 1, Box 8, Sunnyside, Wash.
Filed Mar. 1, 1963, Ser. No. 262,954
7 Claims. (Cl. 90—12)

This invention relates to a novel portable power-operated machine for cutting and bevelling pipe.

The primary object of the invention is the provision of an efficient, fast-acting, and easily handled machine of the kind indicated which is adapted to make a full cut or selected shorter cuts around the wall of pipe, to the full depth of such cuts, in one pass, which can accurately cut out-of-round pipe without adjustments, and which is readily adaptable to cut pipe of different diameters.

Another object of the invention is the provision of a machine of the character indicated above, which has a rotary cutting head which has removable, selectively shaped cutting tool bits, which are adapted to be selected to form cuts of different contours, such as straight bevel, J-bevels, and others.

A further object of the invention is the provision of a machine of the character indicated above, wherein the depths of cuts can be positively controlled, so that its cutting head is prevented from cutting to excessive depths, whereby the undesirable cutting of chill rings and root-beads is precluded, as well as cutting out of too much base metal resulting in a wider than normal cut and weakening of the ensuring weld.

A still further object of the invention is the provision of a machine of the character indicated above, which is adapted for use in fabricating new pipe or in cutting out rejected welds or the like, which are in need of repair.

Other important objects and advantageous features of the invention will be apparent from the following description and the accompanying drawings, wherein, for purposes of illustration only, a specific form of the invention is set forth in detail.

In the drawings:

FIGURE 4 is a vertical longitudinal section taken on the line 4—4 of FIGURE 1;

Figure 1:
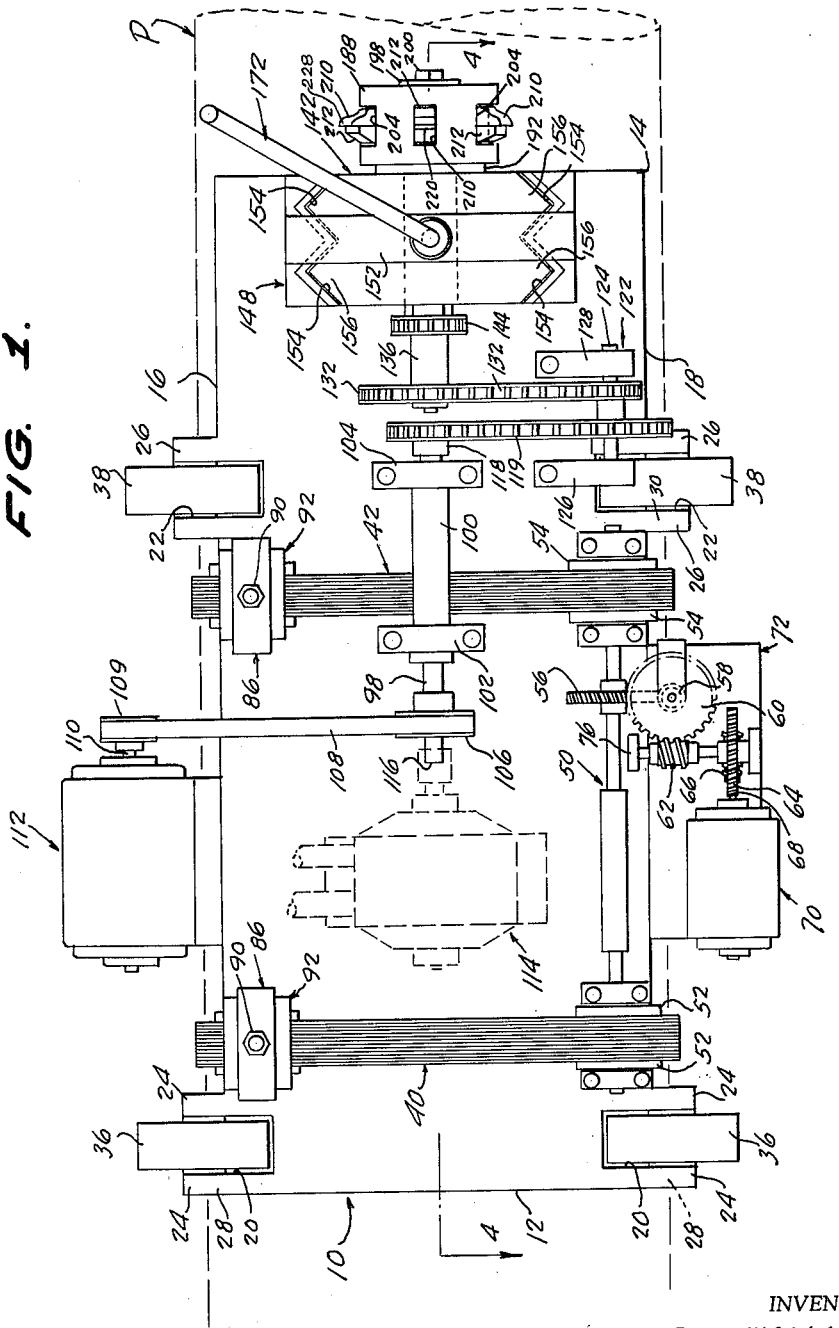
FIGURE 1 is a top plan view of a machine of the present invention shown in place on a pipe, in phantom lines.

Referring in detail to the drawings, wherein like numerals designate like parts throughout the several views, the illustrated machine comprises a longitudinally elongated flat rigid base plate 10 having first and second end edges 12 and 14, respectively, and first and second parallel side edges 16 and 18, respectively. At a location closely adjacent to the first end edge 12, the side edges of the base plate are formed with laterally outwardly opening transverse notches 20, respectively, at whose sides are laterally outwardly extending portions 24, which terminate in downwardly extending lugs 28, respectively. Axle pins 32 extend between the lugs 28 and a flat cylindrical pipe-surface engaging roller 36 journalled thereon. Similar notches 22, outwardly extending portions 26, and downwardly extending lugs 30 are substantially spaced from the second end edges 14 of the base plate 10, and carry axle pins 34, and rollers 38. As shown in FIGURE 4, when the rollers 36 and 38 are in contact with the outer surface of the pipe P, the base plate 10 is spaced out of contact with the pipe.

The rollers 36 and 38 are maintained in forcible and rotary contact with the pipe P, by means of first and second flexible friction bands 40 and 42, which encircle and grip the pipe. The first band 40 is located longitudinally inwardly of and close to the first rollers 36, and the second band 42 is located longitudinally inwardly of and close to the second rollers 38. The bands have teeth 44, on their inner surfaces, which serve to grip the surface of the pipe P and to conformably and drivingly engage pairs of first and second fixed toothed wheels 46 and 48, supported above the upper surface of the base plate 10.

The toothed wheels 46 and 48, at the second side edge 18 of the base plate, are fixed to related ends of a drive shaft 50, which is journalled through pairs of first and second brackets 52 and 54, fixed to and upstanding from the base plate 10. The shaft 50 has a worm wheel 56, near the second brackets 54, which is in mesh with a vertical worm 58, having, at its upper end, a horizontal worm wheel 60 which is in mesh with a horizontal transverse worm 62, having a vertical worm wheel 64, at its laterally outward end. The vertical worm wheel 64 is in mesh with a horizontal worm 66 on the shaft 68 of an electric motor 70, which is fixed upon a longitudinally elongated motor base 72 which is suitably fixed to and extends laterally outwardly from the second side edge 18 of the base plate 10, at a location between and spaced from the first and second pairs of brackets 52 and 54. The vertical worm 58 is journalled in an upstanding bracket 74 on the motor base 72 and another upstanding bracket 76 carries the transverse worm 62. The speed of the electric motor 70 is fixed in relation to the effective rotation of a cutting head, hereinafter described, so that the bands 40 and 42 rotate together and move the machine around the pipe P, at a speed commensurate with the speed of rotation and cutting action of the cutting head.

Figure 2:
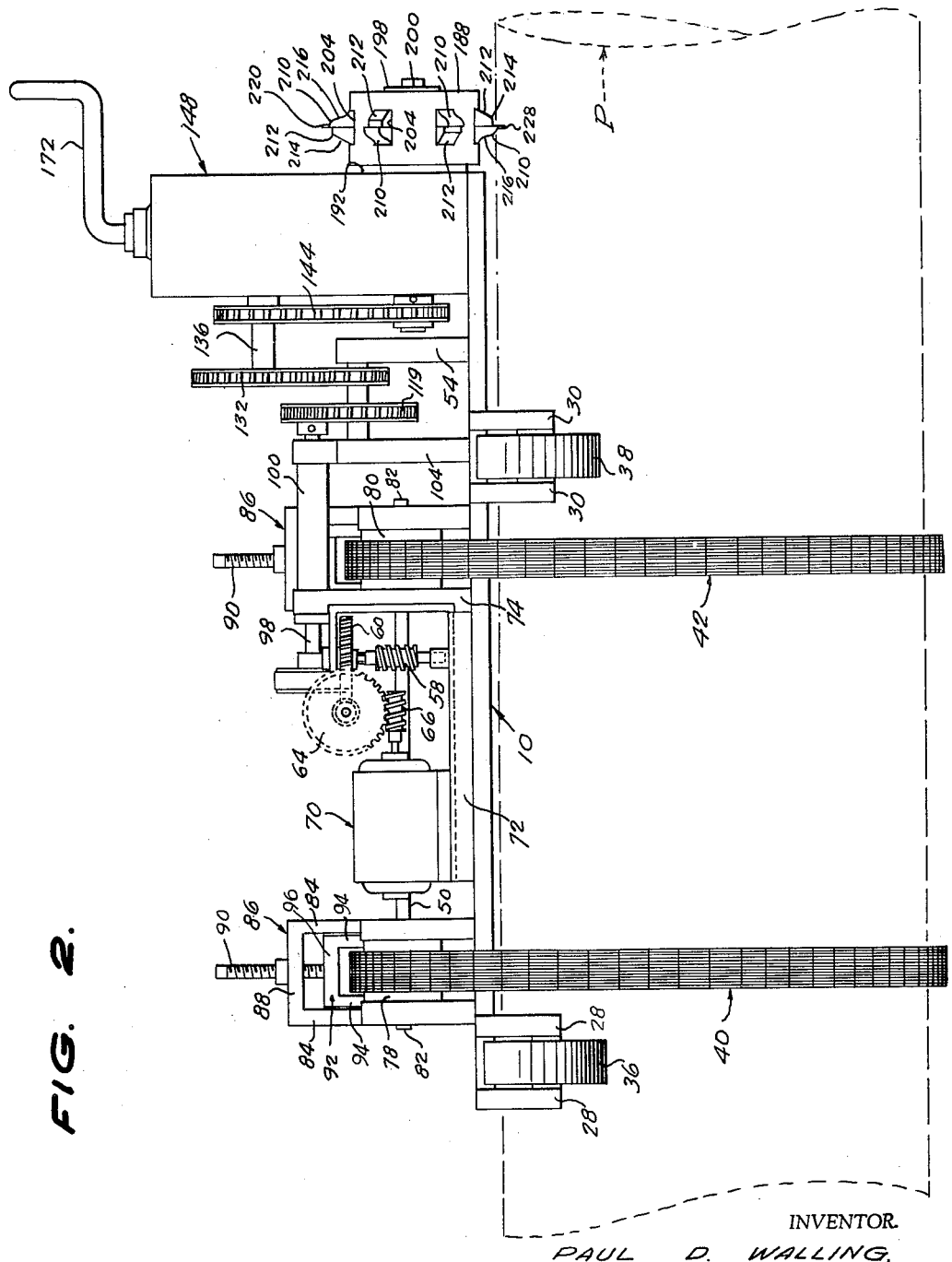
FIGURE 2 is a side elevation of FIGURE 1.
Figure 3:
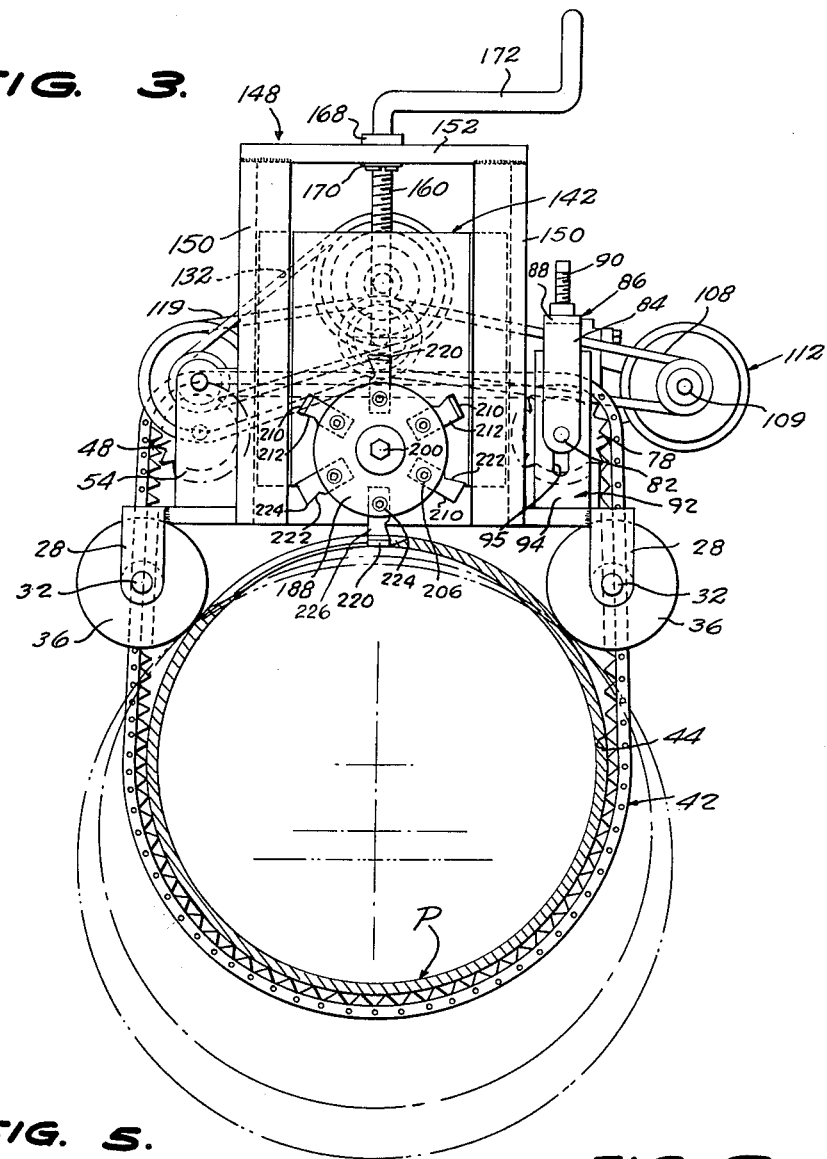
FIGURE 3 is a right-hand end elevation of FIGURE 2.

The bands 40 and 42 are severally trained around adjustable toothed wheels 78 and 80, which are severally aligned with and opposed to the toothed wheels 46 and 48 and mounted upon the base plate 10, at the first side edge 16 thereof. The adjustable toothed wheels 78 and 80, as shown in FIGURES 2 and 3, are journalled on axle pins 82 which are carried across the lower ends of the vertical arms 84 of inverted U-shaped yokes 86 which have cross members 88, through which vertical adjusting screws 90 are threaded. The arms 84 are slidably engaged with the outer sides of pairs of upstanding inverted U-shaped brackets 92, on the base plate 10, between whose arms 94 the wheels 78 and 80 are located, the axle pins 82 being extended through vertical slots 95 in the arms 94. Turning the adjusting screws 90 downwardly against the cross members 96 of the brackets 92 produces upward movements of the adjustable toothed wheels 78 and 80, and tightening of the friction bands 40 and 42 around the pipe P.

The pipe-cutting mechanism of the machine, which is mounted atop of the base plate 10, comprises a horizontal longitudinal drive shaft 98, located on the longitudinal centerline of the base plate, which extends across and is spaced above the second friction band 42, and is journalled through a tubular bearing 100, which is supported, at its ends, by first and second uprights 102 and 104, located at opposite sides of the band 42. As shown in FIGURES 1 and 4, a relatively small first pulley 106 is fixed on the related end of the drive shaft 98, over which is trained a V-belt 108 which is also trained over a pulley 109, fixed on the longitudinal shaft 110 of an electric motor 112, which is mounted on the base plate at the first side edge 16 thereof. Alternatively, as shown in phantom lines in FIGURE 1, the drive shaft 98 is adapted to be driven from an air motor 114, mounted upon the base plate 10, and coupled to the shaft 98, as indicated at 116.

A relatively small second sprocket wheel 118 is fixed on the related end of the drive shaft 98, over which is trained a chain 119 which is trained over a large sprocket wheel 120, which is a component of a reducing assembly 122. The assembly 122 further comprises a horizontal longitudinal shaft 124, extending between and journalled in first and second side brackets 126 and 128, upstanding on the base plate 10, at its second side edge 18, and on which the larger sprocket wheel 120 is fixed. A smaller sprocket wheel 130, fixed on the shaft 124 has a chain 132 trained thereover, which is also trained over a relatively large sprocket wheel 134 which is fixed on the adjacent end of a tubular shaft 136, having a smaller sprocket wheel 138, on its other end. The tubular shaft 136 is journalled on a horizontal longitudinal stub shaft 140 extending from the upper part of a solid vertical slide 142. A chain 144 is trained over the smaller sprocket wheel 138, and over a drive sprocket wheel 141 on a horizontal longitudinal cutting head shaft 146.

The slide 142 is confined to perpendicular movements, relative to the base plate 10, in a fixed slide housing 148, which, as shown in FIGURES 1, 3 and 4, is of inverted V-shape, and comprises a pair of laterally spaced perpendicular legs 150, across whose upper ends a cross member 152 is fixed. The legs are formed, in the facing inner surfaces, with pairs of V-shaped vertical guide grooves 154, which conformably receive V-shaped vertical projections 156, on the sides of the slide 142. The slide 142 is formed with a central vertical threaded counterbore 158 into which is threaded the lower part of an adjusting screw 160, which has a smooth upper portion 162, which is journalled through an opening 164, in the cross member 152, the screw having a collar 168 bearing upon the upper surface of the cross member, and a snap ring 170 bearing against the underside of the cross member. The screw 160 has a crank-handle 172, on its upper end. Adjusting the screw 160 determines the depth of cut of the cutting head of the machine, hereinafter described.

As shown in FIGURE 4, the cutting head shaft 146 has an enlarged diameter middle portion 174, which has reductions, at its ends, which define shoulders 176, which bear against the inward ends of tapered roller bearings 178, which are seated in annular recesses 180, in the ends of a horizontal longitudinal bore 182, formed through the slide 142, at its lower end. As shown in FIGURE 4, the slide 142 is substantially shorter than the housing 148, and the open lower end of the housing is secured in a notch 184, formed in the second end edge 14 of the base plate 10, whereby the slide 142 can be depressed, if desired, below the level of the upper surface of the base plate 10.

The cutting head shaft 146 has a smooth extension 186, extending out of the housing 148, and beyond the second end edge 14 of the base plate 10, on which is fixed a solid cylindrical cutting head body 188 having an axial bore 190 extending therethrough, which receives the extension 186, the extension 186 being somewhat shorter than the body 188, as shown in FIGURE 4. A circular pressure plate 192, fixedly circumposed on the extension 186, has circumferentially spaced locking lugs 194 which enter blind holes 196, in the inward end of the body 188. A pressure washer 198 bears against the outward end of the body 188, and is traversed by a headed clamping screw 200 which is threaded, as indicated at 202, into the outer end of the extension 186, for clamping the body 188 against the pressure plate 192, with the lugs 194 engaged in the holes 196 to preclude rotation of the body 188 relative to the cutting head shaft 146.

The cutting head body 188 is formed with a plurality of similar, equally spaced radial sockets 204 which open to the peripheral surface thereof, in each of which is removably engaged, in back-to-back engagements with each other, a pair consisting of a side cutter bar or bit and a spacer bar, of rectangular cross section key-stock, which are held in place in the related socket, by engagements of outer and inner set screws 206 and 208, severally therewith. These screws are threaded through the head body 188, from related ends thereof, into related ones of the sockets 204.

The side cutter bars or bits 210, here shown as being six in number, are alternated from side-to-side of the body 188, and, as shown in FIGURES 1, 2 and 4, are longer than and extend radially outwardly beyond the spacer bars 212. The exposed sides of the spacer bars 212 are bevelled, at their outer ends, as indicated at 214, to provide clearance in a cut being made or already present in a pipe.

Figure 5:
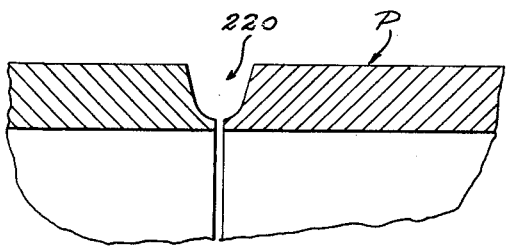
FIGURE 5 is a fragmentary vertical transverse section taken through pipe sections to be welded, showing J-bevel cuts made by the machine in the adjacent ends of the sections; and, FIGURE 6 is a view like FIGURE 5, showing straight bevel cuts in the pipe sections.
Figure 6:
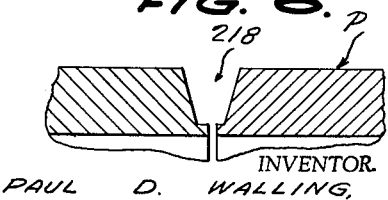

The cutter bars 210 are bevelled, at their outer ends, as indicated at 216, the bevels being either flat, for forming a straight bevel cut 218, as shown in FIGURE 6, or rounded for forming a J-bevelled cut 220, as shown in FIGURE 5, in pipe P. Two of the cutter bars 210, which are diametrically opposed to each other, are formed, on their outer ends, with narrow lead teeth 220, shown in FIGURES 1 and 2. This arrangement requires less power for a cutting operation. However, if desired, the cutting bars 210 can be doubled up, instead of being alternated to either side.

As shown in FIGURE 3, the leading edges of the cutter bars 210 are angularly cut away, as indicated at 222, to define surfaces which intersect the adjacent ends of the outer ends of the cutter bars, so as to define sharp leading ends 224, while the trailing edges 226 of the cutter bars are straight and unindented. The peripheral edges 228 of the cuttter bars are arcuate, the peripheral edges of all of the cutter bars being in the same circle.

It is to be noted that the forms of bits are selected, and the depth of cut predetermined by adjusting the slide 142 in the housing 148, so that the cut of the bits cannot go so far as to spoil the root-bead or root passes of the cuts, or undesirably mar an existing chill ring or a fusion ring; and that where the machine is used to remove defective welding from a cut, choice of bits of proper contour and dimensions, corresponding to the size and contour of the original cut, eliminates widening or deepening thereof, while effectively removing weld material from the cut.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A pipe cutting machine comprising a flat base plate, pairs of transversely aligned pipe engaging rollers journalled on and spaced along the sides of base plate and extending therebelow, pairs of transversely aligned and transversely spaced sprocket wheels journalled on the base plate at the sides thereof, a drive shaft connecting the sprocket wheels at one side of the base plate, first motor means on the base plate operatively connected to the drive shaft, flexible pipe embracing endless friction bands trained over the sprocket wheels, a pipe cutting assembly mounted centrally on the base plate and positioned beyond one end of the base plate, said assembly having a rotary cutting head and second motor means on the base plate operatively connected to the cutting head.

2. A pipe cutting machine comprising a flat base plate, pairs of transversely aligned pipe engaging rollers journalled on and spaced along the sides of base plate and extending therebelow, pairs of transversely aligned and transversely spaced sprocket wheels journalled on the base plate, at the sides thereof a drive shaft connecting the sprocket wheels at one side of the base plate, first motor means on the base plate operatively connected to the drive shaft, flexible pipe embracing endless friction bands trained over the sprocket wheels, a rotary pipe cutting assembly mounted centrally on the base plate and positioned beyond one end of the base plate, said assembly having a rotary cutting head and second motor means on the base plate operatively connected to the cutting head, said second motor means comprising a longitudinal shaft journalled on the upper side of the base plate, and sprocket wheel and sprocket chain speed-reducing means mounted on the upper side of the base plate between and operatively connected to the drive shaft of the second motor means and the cutting head.

3. A pipe cutting machine comprising a substantially flat base plate having outer and inner sides, longitudinally spaced pipe engaging rollers journaled on the base plate at the side edges thereof and extending inwardly from said inner surface, longitudinally spaced wheels mounted on the outer side of the base plate adjacent to the side edges of the base plate, said wheels being located between the rollers, endless pipe embracing bands extending transversely around the base plate and trained over the wheels, a cutting head assembly mounted centrally upon the outer side of the base plate at one end of the base plate, said assembly having a longitudinal rotary cutting head extending beyond said one end of the base plate.

4. A pipe cutting machine according to claim 3, wherein the band carrying wheels at one side edge of the base plate for tightening and loosening the bands relative to a plate are adjustable toward and away from the base pipe embraced by the bands.

5. A pipe cutting machine according to claim 3, wherein motor means is mounted upon the outer side of the base plate between the band carrying wheels and is operatively connected to the rotary cutting head.

6. A pipe cutting machine according to claim 3, wherein a shaft extends between and is connected to the band carrying wheels at one side edge of the base plate, and motor means carried by the base plate and operatively connected to said shaft.

7. A pipe cutting machine according to claim 3, wherein a shaft extends between and is connected to the band carrying wheels at one side edge of the base plate, and motor means carried by the base plate and operatively connected to said shaft, said motor means being mounted on the base plate between the band carrying wheels, said motor means comprising a component operatively connected to the rotary cutting head and a component operatively connected to said shaft.

References Cited by the Examiner
UNITED STATES PATENTS

| | | | |
|---|---|---|---|
| 1,183,158 | 5/16 | Auble | 30—97 |
| 2,291,395 | 7/42 | Levy | 30—97 |
| 2,477,153 | 7/49 | Succop | 29—105 |
| 2,561,484 | 7/51 | Shaw et al. | 90—12 |
| 2,842,238 | 7/58 | Shaw et al. | 90—12 |
| 2,853,820 | 9/58 | Barker | 90—12 |
| 2,914,838 | 12/59 | Robinson | 29—105 |
| 3,023,647 | 3/62 | Bawtinheimer | 90—12 XR |
| 3,067,651 | 12/62 | Hogden et al. | 90—12 |
| 3,088,352 | 5/63 | Tanner | 90—12 XR |

WILLIAM W. DYER, Jr., *Primary Examiner.*